United States Patent [19]

Goldstein et al.

[11] Patent Number: 4,975,320

[45] Date of Patent: Dec. 4, 1990

[54] NONWOVEN PRODUCTS BONDED WITH BINDER EMULSIONS OF COPOLYMERS OF VINYL ACETATE/ETHYLENE/INCOMPATIBLE COMONOMER/LATENT CROSSLINKING COMONOMER

[75] Inventors: Joel E. Goldstein, Allentown; Chung-Ling Mao, Emmaus; John G. Iacoviello, Allentown, all of Pa.

[73] Assignee: Air Products and Chemicals, Inc., Allentown, Pa.

[21] Appl. No.: 305,218

[22] Filed: Feb. 1, 1989

[51] Int. Cl.$^5$ ............... D04H 1/64; D21H 17/37; D21H 17/45
[52] U.S. Cl. ................... 428/288; 162/168.3; 162/168.7; 427/394; 427/396; 428/290; 428/507; 428/510; 428/522
[58] Field of Search ............ 162/168.3, 168.7; 428/288, 290, 507, 510; 427/394, 396

[56] References Cited

U.S. PATENT DOCUMENTS

| | | | |
|---|---|---|---|
| 4,605,589 | 8/1986 | Orphanides | 428/290 |
| 4,616,059 | 10/1986 | Lindemann | 524/458 |
| 4,683,165 | 7/1987 | Lindemann | 428/290 |
| 4,743,498 | 5/1988 | Kedrowski et al. | 428/288 |
| 4,774,283 | 9/1988 | Goldstein | 524/458 |
| 4,808,660 | 2/1989 | Schmeing et al. | 524/814 |

Primary Examiner—James C. Cannon
Attorney, Agent, or Firm—Michael Leach; James C. Simmons; William F. Marsh

[57] ABSTRACT

A two stage polymerization process for preparing a vinyl acetate/ethylene emulsion copolymer containing a monomer which is normally incompatible with vinyl acetate. In the first stage the vinyl acetate and ethylene and, optionally, an active crosslinking comonomer and/or latent crosslinking comonomer are free radical polymerized in the presence of a stabilizing system to yield a first stage polymer emulsion. When the free vinyl acetate monomer content of the first stage emulsion is less than about 5%, the second stage polymerization begins by adding the incompatible monomer. Preferably, there is no cessation of the addition of the free radical source during the transition from the first stage to the second stage polymerization. No additional stabilizing system is added to the reaction in the second stage.

Vinyl acetate/ethylene/incompatible comonomer/latent crosslinking comonomer copolymers prepared by the two stage polymerization process are suitably used as binders for making nonwoven products.

23 Claims, No Drawings

NONWOVEN PRODUCTS BONDED WITH BINDER EMULSIONS OF COPOLYMERS OF VINYL ACETATE/ETHYLENE/INCOMPATIBLE COMONOMER/LATENT CROSSLINKING COMONOMER

TECHNICAL FIELD

The invention relates to vinyl acetate/ethylene (VAE) copolymer binder emulsions and, more particularly, it relates to such emulsion copolymers containing monomers that are ordinarily incompatible with vinyl acetate in the polymerization process.

BACKGROUND OF THE INVENTION

It is very difficult to copolymerize vinyl acetate with several commercially important monomers, especially in the presence of ethylene. While methyl methacrylate (MMA) can be polymerized with vinyl acetate, the level of MMA with which this occurs is insufficient to provide the copolymer with the properties associated with MMA, such as block resistance and solvent tensiles in a nonwoven copolymer binder. Usually a level of 10% MMA stops the vinyl acetate conversion and lower levels of MMA are usually insufficient to afford low blocking.

Copolymerizing vinyl acetate with styrene is very difficult, if at all possible. Even the preparation of a stable blend of polyvinyl acetate and polystyrene emulsions is difficult to obtain.

U.S. Pat. No. 4,616,057 discloses the preparation of an aqueous polymer emulsion containing an interpenetrating polymer network. This reference teaches a method of polymerizing MMA and styrene in a VAE copolymer emulsion. A multi-functional active crosslinker is required in the first stage polymerization and the second stage monomers must be equilibrated with the first stage emulsion before they are polymerized. The examples show that additional surfactants are added with the second stage monomers for this emulsification step.

U.S. Pat. No. 4,683,165 discloses aqueous interpenetrating polymer network emulsions containing a first vinyl acetate-ethylene copolymer network which is intertwined on a molecular scale with a second polystyrene or polymethyl methacrylate network. This patent is a continuation-in-part of the '057 patent.

SUMMARY OF THE INVENTION

The present invention provides aqueous emulsions of vinyl acetate/ethylene (VAE) copolymer binders. The aqueous emulsion comprises a copolymer consisting essentially of vinyl acetate, ethylene, latent crosslinking comonomer, and a comonomer which is substantially incompatible with vinyl acetate.

The VAE copolymer emulsion is prepared by polymerizing vinyl acetate and ethylene under emulsion polymerization conditions in the presence of a stabilizing system by the addition of a free radical source to form a first stage base polymer emulsion, then adding and polymerizing under emulsion polymerization conditions an incompatible comonomer as a second stage, essentially without equilibration with the first stage emulsion, when the vinyl acetate free monomer content of the first stage is less than about 5%, based on emulsion, and without adding more stabilizing system to the reaction in the second stage.

In addition to providing a VAE emulsion copolymer containing copolymerized, substantially incompatible comonomer, the resulting copolymer emulsions do not phase separate and demonstrate very low accelerated sedimentation and grits. Most surprisingly, upon the incorporation of the substantially incompatible comonomer, the resulting VAE emulsion copolymer, compared to the base VAE emulsion copolymer, shows (within experimental error):

(a) no significant increase in particle size,
(b) no significant change in polydispersity, and
(c) no significant shift in the glass transition temperature (Tg) nor a second Tg.

For example, when MMA (Tg=105° C.) is used as the incompatible monomer, no Tg is detected at 105° C. and the VAE copolymer still demonstrates film formation.

The copolymer emulsions of the invention in which the copolymer contains a latent crosslinking comonomer can be used as a nonwoven binder. These emulsions would be applied to a nonwoven web of fibers at a binder add-on sufficient to bond the fibers together to form a self-sustaining web of nonwoven product. Although the physical properties of the VAE emulsion copolymer do not change, the incorporation of the incompatible monomer affects the performance properties of the nonwoven product. The copolymer binders according to the invention provide the nonwoven product with improved anti-blocking properties, improved water and solvent resistance and almost no loss of "hand" compared to the base VAE copolymer binders. In addition, there is an increase in heat resistance (stability) and a decrease in hot tack.

DETAILED DESCRIPTION OF THE INVENTION

The VAE copolymer emulsion comprises an aqueous medium having colloidally dispersed therein about 35–65 wt % of a copolymer consisting essentially of vinyl acetate, 4 to 25 wt % ethylene, optionally 0.01 to 0.15 wt % active crosslinking comonomer and/or 1 to 10 wt % latent crosslinking comonomer, and 8 to 50 wt % of a comonomer which is substantially incompatible with vinyl acetate.

The preferred copolymers consist essentially of vinyl acetate and 5 to 15 wt % ethylene, especially 5 to 10 wt % ethylene, with preferably 3 to 7 wt % of a latent crosslinking comonomer and 15 to 30 wt % of a substantially incompatible comonomer. The copolymer emulsions which are useful as nonwoven binders would have Brookfield viscosities ranging from 50 to 5,000 cps, preferably 100 to 2,000 cps. The copolymers would have a Tg between −30° and 20° C., preferably −5° to 10° C.

Contemplated as the functional, or operative, equivalent of vinyl acetate in the copolymer emulsions are vinyl esters of $C_1$–$C_{18}$ alkanoic acids, such as vinyl formate, vinyl propionate, vinyl laurate and the like.

An "incompatible comonomer" is a monomer which essentially does not copolymerize with vinyl acetate in that the relative reaction ratios (r1:r2) of the comonomer with itself (r1) and with vinyl acetate (r2) is at least 60, preferably at least 100 and most preferably at least 1000. Exemplary of such "incompatible comonomers" are methyl methyacrylate (MMA), styrene, acrylonitrile and α-methyl styrene.

| REACTION RATIO OF VARIOUS MONOMERS | | |
|---|---|---|
| Monomer | r1 | r2 |
| Methyl Methacrylate | 20.00 | 0.015 |
| Styrene | 55.00 | 0.010 |
| Acrylonitrile | 4.05 | 0.061 |

For purposes of the invention, the term "latent crosslinking comonomer" means a functional vinyl monomer in which the functionality causes crosslinking of the polymer upon the subsequent application of energy, generally by applying heat, for example, by drying and curing of the copolymer, often in the presence of a catalyst, or by applying radiation. The latent crosslinking monomer provides thermosetting characteristic to the emulsion copolymer. Upon the subsequent application of energy, the latent crosslinking monomer forms an insoluble crosslinked network. Examples of latent crosslinking monomers are N-methylol acrylamide (NMA), acrylamidoglycolic acid (AGA), methylacrylamidoglycolate methyl ester (MAGME), acrylamidobutyraldehyde dialkyl acetal (ABDA), such as the dimethyl or diethyl acetal, isobutoxy methyl acrylamide (IBMA), 2-acrylamido-2-methylpropane sulfonic acid (AMPS), carboxylic acid monomers such as acrylic acid, methacrylic acid, itaconic acid, crotonic acid and maleic acid, chlorohydroxy-propylmethacrylate, acetoacetoxyethyl (meth)acrylate (AAEA or AAEM) and trimethyl isocyanate (TMI).

The term "active crosslinking comonomer" means a polyethylenically unsaturated compound which immediately provides crosslinking and branching of the polymer during the polymerization step to increase the molecular weight of the emulsion polymer. Subsequent drying and heating or other curing techniques are not required for the crosslinking and branching of the polymer by the active crosslinking comonomer. The following compounds are illustrative of suitable active crosslinking comonomers: alkylene glycol di(meth)acrylates such as ethylene glycol diacrylate and triethylene glycol dimethacrylate, 1,1,1-trimethylol propane dimethacrylate, divinyl benzene, vinyl(meth)acrylate, divinyl adipate, divinyl ether, triallyl (iso)cyanurate, allyl (meth)acrylate, diallyl maleate, diallyl fumarate and others known in the polymerization art.

In addition, the VAE copolymer may contain up to about 5 wt % of other copolymerizable monomers.

The vinyl acetate/ethylene copolymers of the invention are prepared by a two-stage polymerization procedure. In the first stage, the vinyl acetate and ethylene are copolymerized in the presence of stabilizing system comprising a protective colloid and/or surfactants in an aqueous medium under an ethylene pressure, preferably not exceeding about 100 atmospheres (atm), and a free radical source which is added incrementally, the aqueous system preferably being maintained by a suitable buffering agent at a pH of about 2-6. The process first involves a homogenization in which the vinyl acetate suspended in water is thoroughly agitated in the presence of ethylene under the working pressure to effect the dissolution of the ethylene in the vinyl acetate while the reaction medium is gradually heated to polymerization temperature. The homogenization period is followed by a polymerization period during which the free radical source (and an optional reductant) is added incrementally.

If present, the active crosslinking comonomer and the latent crosslinking monomer may be added all at once with the vinyl acetate and ethylene in the first stage or the latent crosslinking comonomer may be added incrementally over the course of the two-stage polymerization reaction, or preferably incrementally during the second stage polymerization. When the latent crosslinking comonomer is an ABDA-type, it is preferred to use the trail addition procedure of U.S. Pat. No. 4,647,611 which is incorporated by reference.

The second stage polymerization including the incorporation of the incompatible comonomer is commenced when the vinyl acetate free monomer content of the first stage reaction is less than about 5%, preferably less than about 2% and most preferably about 1.5% or less.

Various free-radical generating materials can be used in carrying out the polymerization of the monomers in both stages, such as peroxide compounds. Combination systems employing both reducing agents and oxidizing agents can also be used, i.e. a redox system, and are preferred. Suitable reducing agents include bisulfites, sulfoxylates, or alkali metal bisulfite-ketone adducts, or other compounds having reducing properties such as ascorbic acid, erythorbic acid and other reducing sugars. The oxidizing agents include hydrogen peroxide, organic peroxides such as t-butyl hydroperoxide and the like, persulfates, such as ammonium or potassium persulfate and the like. Specific redox systems which can be used include hydrogen peroxide and zinc formaldehyde sulfoxylate; hydrogen peroxide and erythorbic acid; hydrogen peroxide, ammonium persulfate or potassium persulfate with sodium metabisulfite, sodium bisulfite, ferrous sulfite, zinc formaldehyde sulfoxylate or sodium formaldehyde sulfoxylate; and t-butyl hydroperoxide with sodium bisulfite-acetone adduct. Other free radical forming systems that are well known in the art can also be used to polymerize the monomers.

The oxidizing agent is generally employed in an amount of 0.01 to 1%, preferably 0.05 to 0.5%, based on the weight of vinyl acetate introduced into the polymerization system. The reducing agent is ordinarily added in the necessary equivalent amount.

The emulsifying agents composing the stabilizing system which can be used in the polymerization recipe include ionic and nonionic surfactants, preferably the nonionic types which are well known to those skilled in the polymerization art. Suitable nonionic emulsifying agents include poly(oxyethylene) condensates. Other emulsifying agents include protective colloids, such as polyvinyl alcohol and the cellulose materials such as methyl cellulose, hydroxyethyl cellulose, hydroxypropylmethyl cellulose and the like.

The concentration range of the total amount of the emulsifying agents useful is from 0.5 to 10%, preferably 1.5 to 5%, based on total emulsion.

The reaction temperature can be controlled by the rate of free radical addition and by the rate of heat dissipation. Generally, it is advantageous to maintain the temperature between about 48° C. and 52° C. during the first and second stages of the polymerization of the monomers and to avoid temperatures much in excess of 80° C. Although temperatures as low as 0° C. can be used, economically the lower temperature limit is about 30° C. Preferably, the polymerization reaction is controlled to maintain a mean temperature of about 50° C. in the second stage, but at least the same temperature as the first stage.

The reaction time will depend upon variables such as temperature, the free radical forming source and the desired extent of polymerization. It is generally desirable to continue with the second stage reaction until less than 0.5% of the vinyl acetate remains unreacted.

In carrying out the polymerization, an amount of vinyl acetate is initially charged to the polymerization vessel and saturated with ethylene. At least about 10% of the total vinyl acetate to be polymerized is initially charged and the remainder of the vinyl acetate is added incrementally during the course of the first state polymerization. However, the charging of all the vinyl acetate initially with no additional incremental supply is preferred.

When reference is made to incremental addition, whether of vinyl acetate, any comonomer, or free radical source, substantially uniform additions, both with respect to quantity and time, and intermittent additions are contemplated. Such additions are also referred to as "delay" additions.

The quantity of ethylene entering into the copolymer is influenced by the pressure, the agitation and the viscosity of the polymerization medium. Thus, to increase the ethylene content of the copolymer, higher pressures, greater agitation and a low viscosity are employed.

The second stage polymerization may be performed under an ethylene atmosphere, either with make-up ethylene to maintain pressure or under the decaying ethylene pressure of the first stage, or there may be no ethylene atmosphere.

The first stage in the process of forming the vinyl acetate/ethylene copolymer emulsion generally comprises preparation of an aqueous solution containing the stabilizing system and the pH buffering system. This aqueous solution and the initial charge of vinyl acetate and active crosslinking comonomer, if any, are added to the polymerization vessel and ethylene pressure is applied to the desired value. As previously mentioned, the mixture is thoroughly agitated to dissolve ethylene in the vinyl acetate and in the water phase. Conveniently, the charge is brought to polymerization reaction temperature during this agitation. The polymerization is then initiated by introducing initial amounts of the oxidizing agent, the reducing agent having been added with the initial charge. After the polymerization has started, the oxidizing agent and reducing agent are incrementally added as required to continue polymerization. The latent crosslinking comonomer and the remaining vinyl acetate, if any, are then added as separate delays.

As mentioned, the first stage reaction is generally continued until the residual vinyl acetate content is less than about 5%, preferably about 1.5%, whereupon the second stage of the polymerization process is commenced. The incompatible comonomer is then added either as a batch (all at once) or preferably as a delay. Additional latent crosslinking comonomer may also be added during the second stage polymerization.

In one embodiment of the invention, the first stage can comprise the separate preparation of a VAE copolymer emulsion of less than about 5% free vinyl acetate monomer (e.g. a preformed or commercially available VAE copolymer emulsion) upon which the second stage reaction is performed.

During the transition from the first stage to the second stage polymerization reaction in a preferred embodiment for the continuous production of the emulsion, there is essentially no cessation in the addition of the free radical source to the reaction medium.

In both embodiments, however, there is essentially no equilibration of the second stage incompatible comonomer with the polymerization reaction product from the first stage before polymerization of the incompatible comonomer is commenced. In furtherance of the "non-equilibration", no additional stabilizing system is added to the second stage polymerization reaction. The second stage reaction is generally continued until the residual free monomer content is below about 0.5%. The completed reaction product is then allowed to cool to about room temperature while sealed to the atmosphere.

The free radical polymerization of the incompatible comonomer into the VAE emulsion copolymer is started essentially immediately upon its addition to the first stage emulsion. For example, with the first stage VAE emulsion at polymerization temperature, the total amount of incompatible comonomer may be added in bulk with agitation followed immediately by the addition of the free radical source, or both the incompatible comonomer and the free radical source may be added concomitantly as delays.

This essentially immediate addition of the free radical source upon the addition of the incompatible comonomer to the first stage emulsion, i.e. without equilibration, provides the resulting VAE copolymer with improved performance properties over that of a comparable VAE copolymer prepared by essentially equilibrating the incompatible comonomer with the first stage emulsion before it is polymerized.

The vinyl acetate/ethylene copolymer binders of the invention can be used to prepare nonwoven products, or fabrics, by a variety of methods known in the art which, in general, involve impregnation of a loosely assembled mass of fibers with the binder emulsion, followed by a moderate heating to dry the mass. In the case of the present invention, this moderate heating also serves to cure the binder by forming a crosslinked interpolymer. Before the binder is applied, it may, of course, be mixed with a suitable catalyst for the crosslinking monomer. For example, an acid catalyst such as mineral acids, e.g., hydrogen chloride, or organic acids, e.g., oxalic acid or acid salts such as ammonium chloride are suitably used as known in the art. The amount of catalyst is generally from 0.5 to 2% of the total polymer.

The starting fiber layer or mass can be formed by any one of the conventional techniques for depositing or arranging fibers in a web or layer. These techniques include carding, garnetting, air-laying, wet laying, and the like. Individual webs or thin layers formed by one or more of these techniques can also be laminated to provide a thicker layer for conversion into a fabric. Typically, the fibers extend in a plurality of diverse directions in general alignment with the major plane of the fabric, overlapping, intersecting and supporting one another to form an open, porous structure.

When reference is made to "cellulose" fibers, those fibers containing predominantly $C_6H_{10}O_5$ groupings are meant. Thus, examples of the fibers to be used in the starting layer are the natural cellulose fibers such as wood pulp, cotton and hemp and the synthetic cellulose fibers such as rayon, and regenerated cellulose. Often the fiber starting layer contains at least 50% cellulose fibers, whether they be natural or synthetic, or a combination thereof. Often the fibers in the starting layer may comprise natural fibers such as wool, jute; artificial fibers such as cellulose acetate; synthetic fibers such as polyamides, nylon, polyesters, acrylics, polyolefins, i.e., polyethylene, polyvinyl chloride, polyurethane and the like, alone or in combination with one another.

The fiber starting layer is subjected to at least one of several types of bonding operations to anchor the individual fibers together to form a self-sustaining web. Some of the better known methods of bonding are overall impregnation or printing the web with intermittent or continuous straight or wavy lines or areas of binder extending generally transversely or diagonally across the web, and additionally, if desired, along the web.

The amount of copolymer binder, calculated on a dry basis, applied to the fibrous starting web, is that amount which is at least sufficient to bind the fibers together to form a self-sustaining web and suitably ranges from about 3 to about 100% or more by weight of the starting web, preferably from about 10 to 50 wt % of the starting web. The impregnated web is then dried and cured. Thus the nonwoven products are suitably dried by passing them through an air oven or the like and then through a curing oven. Typical conditions to achieve optimal crosslinking are sufficient time and temperature such as drying at 150°–200° F. (66°–93° C.) for four to six minutes, followed by curing at 300°–310° F. (149°–154° C.) for three to five minutes or more. However, other time-temperature relationships can be employed as is well known in the art, shorter times and higher temperatures or longer times at lower temperatures being used.

The VAE emulsion copolymers of the invention can also be used as a durable press agent in the treatment of woven textiles. A woven textile product is treated in convention manner with 2 to 10 wt % VAE copolymer.

EXAMPLE 1

Preparation of VAE/AGA/Am/MMA Emulsion

A 1 gallon reactor was charged with 540.3 g of deionized water, 1364.8 g vinyl acetate, 25.2 g Rewopol NOS25 surfactant, 55.9 g Siponate DS-10 surfactant, 27.0 g of a 25% aqueous solution of sodium vinyl sulfonate (SVS), 0.8 g triallyl cyanurate (TAC), 6.0 g phosphoric acid, 0.05 g ferric ammonium sulfate and 30.4 g of a reductant solution (2.0 g sodium meta-bisulfite, 1.2 g acetone and 436.8 g deionized water) and purged for 40 minutes with nitrogen. The kettle was heated to 48° C., agitated at 800 rpm, pressurized with ethylene to 340 lbs (23.1 atm) and initiated by adding a 0.3% aqueous solution of t-butylhydroperoxide (TBHP) at 0.2 ml/min. Upon initiation, 632.0 g of an aqueous solution (101.2 g acrylamidoglycolic acid (AGA) and 16.1 g acrylamide (Am) in 519.7 g deionized water) were added at 2.1 ml/min. Ten minutes later the reducing agent solution was added at 0.3 ml/min and the reaction temperature was maintained at 49° C. At the 90 min mark the oxidizing agent was changed to a 1.5% aqueous solution of TBHP and the reducing agent to a solution of 10.0 g sodium metabisulfite and 6.0 g acetone in 424.0 g deionized water. The rates were controlled such that 1.5 ml of reducing agent was added per ml of oxidizing agent and a 6° C. exotherm was maintained. At the 4 hour mark the ethylene and AGA delay were turned off. At the 5 hour mark the vinyl acetate free monomer was 1.5% and 253.0 g of an aqueous solution (40.5 g AGA and 6.4 g Am in 206.1 g deionized water) was added at 4.2 ml/min and 556.0 g of methyl methacrylate (MMA) was added at 9.9 ml/min. After 1 hour, those delays were complete and ten minutes later the free monomer are less than 1.5% so the reaction was cooled, degassed and treated with 5 g of a 10% aqueous solution of TBHP and 4.6 g of a 50% aqueous solution of Wacker XF-B41-08 defoamer. Solids 50.0%; viscosity 75 cps.

EXAMPLE 2

The same as example 1 except the ethylene was pressurized to 440 lbs. (30 atm). Solids: 51.6%, viscosity: 150 cps.

EXAMPLE 3

The same as example 2 except the aqueous AGA delay was not restarted during the second stage of the polymerization. Solids: 53.0%, viscosity: 115 cps.

EXAMPLE 4

The same as example 2 except acrylamidobutyraldehyde diethyl acetal (ABDA) replaced the AGA as the functional monomer and the initial functional monomer delay started at the 2 hour mark rather than at initiation. Solids: 50.6%, viscosity: 120 cps.

EXAMPLE 5

The same as example 1 except styrene replaced methyl methacrylate in the second stage. Solids: 45%; viscosity: 55 cps.

EXAMPLE 6

As 1 gallon reactor was charged with 924.0 g of deionized water, 1450.0 g of vinyl acetate, 159.0 g of Polystep B-27 surfactant, 1.24 g acetic acid, 0.1 g ferrous sulfate heptahydrate, 1.0 g sodium acetate and 2.0 g sodium formaldehyde sulfoxylate (SFS) and purged for 40 minutes with nitrogen. The kettle was heated to 48° C., agitated at 900 rpm, pressurized with ethylene to 625 lbs (42.5 atm) and initiated by adding a 6.0% solution of TBHP at 0.4 ml/min. Upon initiation, 575.0 g of an aqueous solution (620.0 g N-methylolacrylamide [NMA, 48%] and 341.8 g deionized water) were added at 3.6 ml/min. Ten minutes later the reducing agent solution (20.7% SFS in deionized water) was added at 0.4 ml/min and the reaction temperature maintained at 49° C. At the 3 hour mark the ethylene was turned off. At the four hour mark when the vinyl acetate free monomer content was 2%, 550.0 g of methyl methacrylate was added at 9.9 ml/min and 255.0 g of NMA delay was added at 4.2 ml/min. After 1 hour, those delays were completed and ten minutes later the free monomer were less than 1.5%. The reaction was cooled, degassed and treated with 2.3 g Colloid 585 defoamer in 2.3 g deionized water, 10.0 g of a 10% SFS solution and 16.0 g of the 6.0% TBHP solution. The pH of the emulsion was raised to 6.0 with 3.0 g 28% ammonium hydroxide. Solids: 53.0%; viscosity: 481 cps.

EXAMPLE 7

The same as example 6 except the NMA delay was 310.0 g NMA (48%) and 651.8 g deionized water, the second stage catalyst was 4.6 g TBHP, 10.0 g potassium persulfate and 176.0 g deionized water and styrene replace the methyl methacrylate. Solids: 50.8%; viscosity: 515 cps.

EXAMPLE 8

The same as example 7 except the styrene was replaced by a solution of 375.0 g styrene and 175.0 g acrylonitrile.

EXAMPLE 9

The same as example 1 except acrylamide replaced the AGA. Solids: 52.0%; viscosity: 9000 cps.

EXAMPLE 10

The same as example 1 except only 51.0 g of lauryl methacrylate was added at 0.8/min instead of the methyl methacrylate and the second stage began when the free monomer for vinyl acetate was 5.0%. The reaction was extremely difficult to finish. Rather than the free monomer for vinyl acetate being below 0.5% after the second stage delay was complete, an additional hour was required to achieve a free monomer of 1.1%. Solids: 45.0%; viscosity: 120 cps.

EXAMPLE 11

The same as example 10 except methyl methacrylate was used rather than lauryl methacrylate. As the second stage was started at the same point as example 10, the same results regarding degree of difficulty in finishing the polymerization was observed. Solids: 47.0%; viscosity: 80 cps.

EXAMPLE 12

The same as example 11 but the methyl methacrylate addition was started when the free monomer of the vinyl acetate was 10%. The delta closed and could not be reopened and the free monomer of the vinyl acetate did not decrease.

EXAMPLE 13

The same as example 10 except that N-vinyl pyrrolidone replaced the lauryl methacrylate. The same difficulties in finishing the reaction was observed. Solids: 44.0%; viscosity: 75 cps.

Examples 10–13 demonstrate the need to have the free vinyl acetate monomer content of the first polymerization stage below 5% before the second stage polymerization is commenced in order to have a procedure that is industrially acceptable.

EXAMPLE 14

The same as example 1 except the TAC was not included in the reaction. Solids: 45.8%; viscosity: 130 cps.

It can be seen from the data in Table 1 that the Tg of each of the polymers prepared with a second stage polymerization was, within experimental error, essentially the same as the Tg of the base VAE emulsion without a second stage polymerization. The same holds true for the particle size (number average=DN) and the polydispersity (DW/DN).

TABLE 1

| Example | Tg (°C.) | Tg VAE Base | DN | DN VAE Base | DW/DN | DW/DN VAE Base |
|---|---|---|---|---|---|---|
| 1 | 17.5 | 18.5 | 0.262 | 0.247 | 1.81 | 2.11 |
| 2 | 10.0 | 8.0 | 0.252 | 0.230 | 1.61 | 1.99 |
| 3 | 7.5 | 8.0 | 0.191 | 0.230 | 2.55 | 1.99 |
| 4 | 7.0 | 8.0 | 0.276 | 0.230 | 1.92 | 1.99 |
| 5 | 20.0 | 18.5 | | 0.247 | | 2.11 |
| 6 | 2.0 | 2.0 | 0.178 | 0.170 | 2.78 | 2.82 |
| 7 | 3.0 | 2.0 | 0.168 | 0.170 | 2.80 | 2.82 |
| 9 | 17.0 | 18.5 | | 0.247 | | 2.11 |
| 10 | 18.5 | 18.5 | 0.242 | 0.247 | 2.16 | 2.11 |
| 11 | 20.0 | 18.5 | 0.267 | 0.247 | 2.23 | 2.11 |
| 13 | 19.0 | 18.5 | 0.230 | 0.247 | 2.05 | 2.11 |
| 14 | 16.5 | 18.5 | 0.312 | | 1.71 | |

Table 2 presents blocking and handfeel data for the VAE emulsion copolymers prepared with a second stage compared to the base VAE emulsion without a second stage polymerization. The laboratory blocking data was generated following the blocking resistance test of U.S. Pat. No. 4,774,283. The industrial blocking data was generated by an industrial blocking test. In both blocking tests, the lower the number, the better the blocking resistance.

The handfeel or "softness" was determined using a Thwing-Albert Handle-O-Meter in which the lower the number, the softer the handfeel following the test set forth in U.S. Pat. No. 4,605,589. The data shows that the incorporation of the "hard" comonomer MMA did not have an adverse impact on the handfeel.

It has been the experience of the inventors that with regard to handfeel, the Tg of the copolymer binder controls the measured handfeel. Therefore, as the Tg of the emulsion copolymers did not significantly change upon the second stage polymerization incorporation of the incompatible comonomer, it is believed that the handfeel measurement would also not change. The data for examples 1 and 2 support this assumption.

TABLE 2

| Example | Industrial Blocking | Laboratory Blocking | Handfeel |
|---|---|---|---|
| 1 | 2.1/4.8* | 0.32/0.5* | 10/10* |
| 2 | 0.7/6.3 | 0/0.75 | 40/40 |
| 3 | /6.3 | 0/0.75 | |
| 4 | /6.3 | 0/0.75 | |
| 5 | /4.8 | | |
| 6 | /1.0 | 0.60/1.0 | /35 |
| 7 | /1.0 | 0.87/1.0 | |
| 9 | /4.8 | | |
| 10 | /4.8 | | |
| 11 | /4.8 | | |
| 13 | /4.8 | | |

*VAE (TWO STAGE/VAE BASE

EXAMPLE 15

In this example a commercially available VAE/N-methylolacrylamide copolymer emulsion (Airflex 109) was used as the first stage emulsion. After a 15 min. subsurface nitrogen purge of a 1 gallon reactor containing 2000 g Airflex 109 emulsion was added a mixture of 235 g MMA, 25 g NMA (48% in H$_2$O), 235 g deionized water and 0.1 g ferrous sulfate. The pH was adjusted to 4.5 with phosphoric acid. To the stirred mixture at 50° C., the redox delays were added at 0.25 ml/min. (~6% TBHP solution and a 20.7% SFS solution). This reaction was complete within an hour. Example 15: Solids: 53.4%; viscosity: 135 cps; Tg 2° C. AIRFLEX 109: Solids: 52.6%, viscosity: 1000 cps; Tg 1° C.

EXAMPLE 16

A 1 gallon reactor was charged with 474.0 g of deionized water, 159.0 g Polystep B27 surfactant, 0.1 g ferrous sulfate, 1 g sodium acetate, 2.0 g SFS, 1.3 g acetic acid and 1450 g vinyl acetate and purged for 30 minutes with nitrogen. The kettle was heated to 50° C., agitated at 900 rpm, pressurized with ethylene to 625 lbs (42.5 atm) and initiated by adding a 3.0% aqueous solution of TBHP at 0.4 ml/min. Upon initiation, the reducing agent delay (20.7% aqueous solution of SFS) was begun at 0.4 ml/min. as was an 11.2% aqueous solution of NMA at 4.1 ml/min. [650 ml for 160 minutes]. Rate of oxidizing and reducing agent delays were controlled to maintain an 8° C. exotherm. When the NMA delay was complete, the ethylene makeup was turned off. At the three hour mark, the vinyl acetate free monomer was 1.5% and 250 g of 12.8% aqueous NMA and 250 g MMA were each added at 8.3 ml/min. After thirty minutes, these delays were complete and ten minutes later the redox delays were turned off. The reaction was cooled, degassed and treated with 10 g of 10% SFS, 16 g of 5.9% aqueous hydrogen peroxide and 4.6 g of 50% Colloid 585 defoamer. Solids: 53.4%; viscosity: 135 cps.

EXAMPLE 17

The same as Example 16 except 500 g styrene was substituted for the MMA and the styrene delay and the second NMA delay took one hour.

EXAMPLE 18

The same as Example 17 except 25% of the styrene was replaced with butyl acrylate. Solids: 47.0%; viscosity: 55 cps.

EXAMPLE 19

The same as Example 18 except 25% of the styrene was replaced with acrylonitrile. The residual acrylonitrile prevented any further testing.

EXAMPLE 20

In this example a series of commercially available VAE copolymer emulsions having a free vinyl acetate monomer content of less than about 0.7% were used as the first stage emulsion. These emulsions were treated with a second stage polymerization following Example 15 to provide a finished composition which was about 80% base VAE emulsion, 18% MMA and 2% AGA. These compositions were then evaluated as a nonwoven binder.

Table 3 shows that the second stage polymerization provided significant improvement in binder performance.

TABLE 3

| Base VAE Polymer Polymer + 2nd Stage | Solids % | Tg °C. | TENSILES | | | | | |
|---|---|---|---|---|---|---|---|---|
| | | | Dry g | Wet g | MEK g | Hand g | Dn | Dw/Dn |
| A-100HS | 55.6 | 5.0 | 12.5 | 1.0 | 2.0 | 77 | 0.132* | 1.5* |
| A-100HS + 2nd Stage | 50.3 | 10.0 | 14.5 | 2.0 | 2.2 | 84 | 0.147 | 1.3 |
| A-410 | 55.5 | 9.0 | 12.5 | 1.3 | 2.9 | 82 | 0.54 | 1.21 |
| A-410 + 2nd Stage | 51.0 | 9.0 | 14.2 | 3.4 | 3.1 | 81 | — | — |
| CA-50 | 62.0 | 8.0 | 11.5 | 1.0 | 3.7 | 80 | 1.1 | 1.4 |
| CA-50 + 2nd Stage | 59.0 | 4.5 | 12.5 | 2.0 | 3.8 | 82 | 1.2 | 1.3 |
| A-416 | 52.0 | 5.0 | 11.3 | 1.2 | 3.1 | 69 | 0.5* | 1.4* |
| A-416 + 2nd Stage | 48.0 | 9.5 | 11.8 | 2.3 | 3.5 | 76 | 1.2 | 1.2 |
| A-199 | 50.4 | 19.0 | 16.6 | 1.3 | 2.2 | 104 | 0.11* | 1.6* |
| A-199 + 2nd Stage | 48.2 | 23.0 | 16.8 | 2.1 | 2.6 | 116 | 0.14 | 1.4 |
| A-465 | 66.4 | −3.0 | 10.4 | 1.0 | 2.7 | 88 | 0.3 | 2.9 |
| A-465 + 2nd Stage | 63.8 | −2.5 | 12.2 | 3.1 | 3.9 | 61 | 0.4 | 2.3 |
| A-300 | 55.1 | 19.0 | 14.9 | 1.2 | 3.8 | 114 | 0.7 | 1.3 |
| A-300 + 2nd Stage | 50.6 | 22.0 | 15.8 | 3.6 | 4.7 | 86 | 0.7 | 1.3 |
| A-403 | 53.7 | −22.0 | 9.2 | 1.0 | 3.3 | 82 | 0.4 | 1.3 |
| A-403 + 2nd Stage | 49.5 | −24.0 | 10.6 | 2.0 | 3.7 | 63 | 0.7 | 1.5 |
| F-153 | 56.5 | −35.0 | 7.5 | 1.3 | 2.8 | 71 | 0.1 | 2.5 |
| F-153 + 2nd Stage | 53.0 | −36.0 | 9.5 | 2.4 | 3.5 | 68 | 0.1 | 2.3 |
| A-RP-245 | 49.8 | −6.0 | 12.5 | 0.8 | 5.7 | 110 | 0.5 | 1.3 |
| A-RP-245 + 2nd Stage | 48.0 | −7.0 | 15.9 | 2.5 | 6.7 | 101 | 0.8 | 1.4 |

*SFFF as opposed to disc.
A = Airflex ® Emulsion
F = Flexbond ® Emulsion

STATEMENT OF INDUSTRIAL APPLICATION

The invention provides a method for preparing vinyl acetate/ethylene copolymer emulsion binders which contain monomers that are normally incompatible with vinyl acetate in the polymerization process. The binders are used to prepare nonwoven products.

We claim:

1. In a nonwoven product comprising a nonwoven web of fibers bonded together with a vinyl acetate-/ethylene copolymer binder deposited from an aqueous emulsion of the copolymer at a binder add-on sufficient to bond the fibers together to form a self-sustaining web, the improvement which comprises a vinyl acetate/ethylene/incompatible comonomer/latent crosslinking comonomer copolymer binder prepared by
    (a) polymerizing vinyl acetate and ethylene under emulsion polymerization conditions in the presence of a stabilizing system to form a first stage polymer emulsion having a vinyl acetate free monomer content less than 5%, and
    (b) adding and polymerizing the incompatible comonomer as a second stage under emulsion polymerization conditions essentially without equilibrating the incompatible comonomer with the first stage emulsion and essentially without adding additional stabilizing system, the latent crosslinking comonomer being added and polymerized in step (a) or step (b), or both.

2. The nonwoven product of claim 1 in which the polymerization of step (b) commences immediately following the bulk addition of the incompatible comonomer to the first stage emulsion.

3. The nonwoven product of claim 1 in which the addition of the incompatible comonomer and the latent crosslinking comonomer in step (b) is a delay addition.

4. The nonwoven product of claim 1 in which the vinyl acetate free monomer content of the first stage polymerization product is less than about 2%.

5. The nonwoven product of claim 1 in which the vinyl acetate free monomer content of the first stage polymerization product is about 1.5% or less.

6. The nonwoven product of claim 1 in which the incompatible comonomer is methyl methacrylate, styrene or acrylonitrile.

7. The nonwoven product of claim 1 in which the incompatible comonomer is methyl methacrylate.

8. The nonwoven product of claim 1 in which the latent crosslinking monomer is N-methylolacrylamide, acrylamidoglycolic acid, or acrylamidobutyraldehyde dialkyl acetal.

9. The nonwoven product of claim 1 in which steps (a) and (b) are performed continuously without interruption of the addition of the free radical source going from step (a) to step (b).

10. In a nonwoven product comprising a nonwoven web of fibers bonded together with a vinyl acetate-/ethylene emulsion copolymer binder, the improvement which comprises a vinyl acetate/ethylene/incompatible comonomer/latent crosslinking comonomer emulsion copolymer prepared by adding the incompatible and latent crosslinking comonomers to a first vinyl acetate/ethylene copolymer emulsion which has a free vinyl acetate content less than 5% and without equilibrating the incompatible comonomers with the first emulsion, essentially immediately polymerizing the comonomers essentially without adding additional stabilizing system.

11. The nonwoven product method of claim 10 in which the first vinyl acetate/ethylene copolymer emulsion has a free vinyl acetate content of about 1.5% or less.

12. The nonwoven product of claim 10 in which the incompatible monomer is methyl methacrylate, styrene or acrylonitrile.

13. The nonwoven product of claim 10 in which the incompatible monomer is methyl methacrylate.

14. The nonwoven product of claim 10 in which the incompatible monomer is styrene.

15. The nonwoven product of claim 10 in which the latent crosslinking comonomer is N-methylolacrylamide or acrylamidoglycolic acid.

16. The nonwoven product of claim 13 in which the latent crosslinking comonomer is N-methylolacrylamide or acrylamidoglycolic acid.

17. In a nonwoven product comprising a nonwoven web of fibers bonded together with a vinyl acetate-/ethylene emulsion copolymer binder, the improvement which comprises an aqueous emulsion copolymer binder prepared by (a) polymerizing vinyl acetate and ethylene under emulsion polymerization conditions in the presence of a stabilizing system to form a first stage copolymer emulsion having a vinyl acetate free monomer content less than 5%, and (b) adding and polymerizing methyl methacrylate and a latent crosslinking comonomer as a second stage under emulsion polymerization conditions essentially without equilibrating the methyl methacrylate with the first stage emulsion and essentially without adding additional stabilizing system, sufficient amounts of the monomers being used in steps (a) and (b) to provide a copolymer consisting essentially of vinyl acetate, 4–25 wt % ethylene, 8–50 wt % methyl methacrylate and 1–10 wt % latent crosslinking comonomer and having a single Tg.

18. The nonwoven product of claim 17 in which the copolymer consists essentially of vinyl acetate, 5–15 wt % ethylene, 3–7 wt % latent crosslinking comonomer and 15–30 wt % methyl methacrylate.

19. The nonwoven product of claim 17 in which the copolymer contains 0.01–0.15 wt % active crosslinking comonomer.

20. The nonwoven product of claim 17 in which the first stage copolymer emulsion of step (a) has a vinyl acetate free monomer content of about 1.5% or less.

21. The nonwoven product of claim 18 in which the copolymer contains N-methylolacrylamide or acrylamidoglycolic acid as the latent crosslinker.

22. The nonwoven product of claim 21 in which steps (a) and (b) are performed continuously without interruption of the addition of the free radical source from step (a) or step (b).

23. The nonwoven product of claim 22 in which no additional ethylene is added during step (b).

* * * * *